Nov. 19, 1946.  F. C. MITCHELL ET AL  2,411,453
APPARATUS FOR MAKING ALKYL LEAD COMPOUNDS
Filed July 23, 1942  2 Sheets-Sheet 1

INVENTORS
Frederick C. Mitchell
James C. Lawrence
Joseph L. Stecher
BY
Edwin C. Woodhouse
ATTORNEY Nov. 19, 1946.    F. C. MITCHELL ET AL    2,411,453
APPARATUS FOR MAKING ALKYL LEAD COMPOUNDS
Filed July 23, 1942    2 Sheets—Sheet 2

INVENTORS
FREDERICK C. MITCHELL
JAMES C. LAWRENCE
JOSEPH L. STECHER
BY
Edwin C. Woodhouse
ATTORNEY Patented Nov. 19, 1946

2,411,453

UNITED STATES PATENT OFFICE 2,411,453

APPARATUS FOR MAKING ALKYL LEAD COMPOUNDS

Frederick Chorlton Mitchell, Wilmington, Del., James Cuthbert Lawrence, Moylan, Pa., and Joseph Ludwig Stecher, Wilmington, Del., assignors to E. I. du Pont de Nemours & Company, Wilmington, Del., a corporation of Delaware Application July 23, 1942, Serial No. 452,106

9 Claims. (Cl. 23—260)

This invention relates to a process and apparatus for making alkyl lead compounds and for carrying out similar chemical processes whereby such processes may be carried out more rapidly and successfully than has been possible heretofore.

In the commercial production of tetra ethyl lead, lead-mono-sodium alloy is placed in an autoclave and ethyl chloride is added to it as rapidly as possible while still maintaining control over the reaction. As is well known in the art, the reaction is exothermic and large quantities of heat must be removed to prevent development of excess temperatures and pressures, which may cause rupture of the equipment with explosive violence. One of the most efficient means of heat removal has involved the use of a condenser to condense the vaporized ethyl chloride and the return of the condensate to the source of supply of the ethyl chloride. Prior to the present invention, tetra ethyl lead was produced commercially by the method of U. S. Patent No. 2,091,112, issued to Amick, Parmelee and Stecher. In accordance with such process, vaporized ethyl chloride was condensed in a condenser and the material from the condenser was led into the ethyl chloride storage tank and the condensed ethyl chloride fed back into the autoclave along with the fresh ethyl chloride at a controlled rate.

While the process of Patent 2,091,112 has been very satisfactory in practice, it had certain features which definitely limited the time required for completing the process and presented problems in successfully carrying out the process. These problems are due to the fact that, in the course of the reaction between ethyl chloride and lead sodium alloy, some ethane, ethylene and butane are formed. Both ethane and ethylene are non-condensible at the temperatures and pressures of the reaction and, unless some provision is made for their control, they tend to vapor lock the condenser, cause unduly high pressures and upset the pressure-temperature relationships of the ethyl chloride. In the process and apparatus of Patent 2,091,112, provision was made to control the effect of the non-condensible gases to some extent. In this patent, the condenser tubes were restricted to such a degree that the velocity of the gases would be sufficient to carry the non-condensibles through the condenser and into the ethyl chloride feed tank. The ethyl chloride feed tank was made overlarge so as to hold these gases without obtaining a large rise in pressure. Provision was also made to vent the hydrocarbon gases from the ethyl chloride feed tank so as to reduce the pressures to some extent.

With the process and apparatus of Patent 2,091,112, the rate of addition of the ethyl chloride to the autoclave was strictly limited. The necessary tube restrictions in the condenser cause a pressure drop across the condenser, decreasing the available head for feeding the ethyl chloride. When the ethyl chloride feed valve was progressively opened, more vaporization occurred, the pressure drop through the condenser increased and only a low feed rate of ethyl chloride was obtained. When the tank was vented to remove accumulated noncondensibles, the feeding head on the ethyl chloride was further reduced. Also, unless large and uneconomical feed tanks were employed, the permanent gases in the system upset the ethyl chloride pressure-temperature relationships. Furthermore, when the reaction slowed down, there was a definite tendency for the condenser to become vapor locked because the velocity of the gases through the condenser was insufficient to sweep out the non-condensibles. Another objectionable feature of the process of Patent 2,091,112 was that, as the feed valve was opened to a large extent, increased vaporization and condensation of ethyl chloride occurred, more condensate was returned to the feed tank and the net disappearance of ethyl chloride from the feed tank remained substantially constant and was not increased by further opening of the feed valve.

The use of tetra ethyl lead has greatly increased requiring increased production. For the reasons outlined hereinbefore, no further economically feasible reductions in time and increase in production could be made by employing the process and apparatus of Patent 2,091,112. Applicants have discovered a new process and apparatus whereby the manufacture of tetra ethyl lead can be carried out more successfully in a much shorter period of time, thereby materially increasing production. Applicants' new process and apparatus overcomes the objections and problems inherent in the process and apparatus of Patent 2,091,112.

An object of the present invention is to provide a method and apparatus for manufacturing alkyl lead compounds and particularly tetra ethyl lead more economically than has heretofore been possible by decreasing the manufacturing time cycle. Another object is to provide a method and apparatus which will permit a more rapid addition of ethyl chloride and the like to lead-sodium alloy while still maintaining adequate control over the reaction. A further object is to provide a method and apparatus for accurate automatic control of the reaction and the pressures obtained therein by venting non-condensibles from the autoclave equipment automatically in conjunction with automatic control of the flow of cooling media to the condenser and the autoclave. A still further object is to provide a process and apparatus which will allow maximum removal of heat from the reaction by the use of full flow of cooling media to the condenser and the autoclave, as it is needed, and maintaining all of the surface of the condenser available for condensation and preventing vapor lock. Other objects are to advance the art. Still other objects will appear hereinafter.

The above and other objects may be accomplished in accordance with our invention, which will be explained in detail hereinafter, reference being made to the accompanying drawings wherein—

Figure 1:
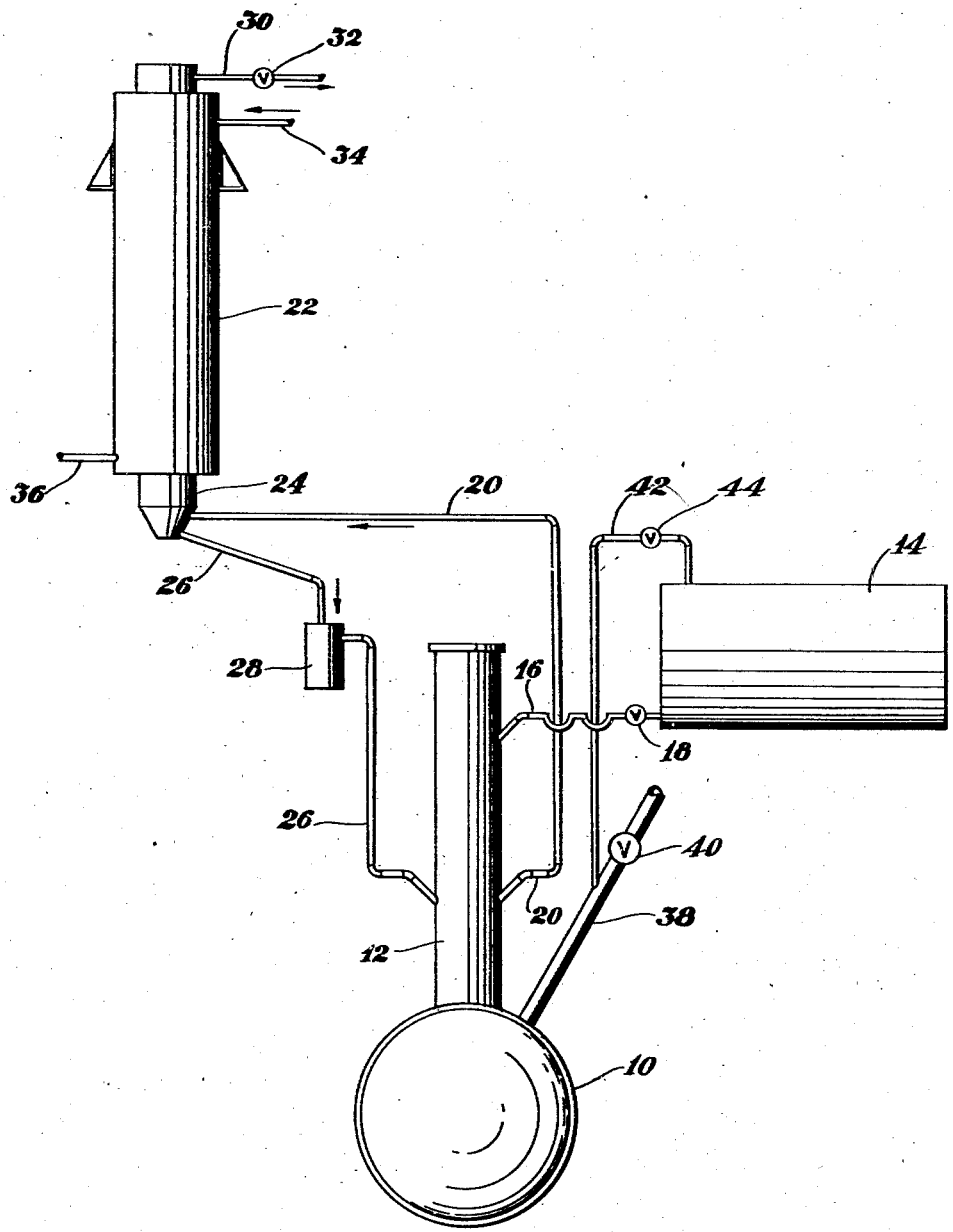
Fig. 1 is a somewhat diagrammatic drawing of one type of apparatus which is suitable for carrying out our invention.

Referring first to Fig. 1, the apparatus comprises a conventional liquid cooled jacketed autoclave 10, provided with the usual charging pipe 12 for the lead-sodium alloy and which is hermetically closed by a suitable valve or cap not shown. The ethyl chloride storage tank 14 may be supported on a scale as is usual. Ethyl chloride is fed to the autoclave from the tank 14 through pipe 16 controlled by valve 18. Conduit 20 is provided for conducting vapors from the autoclave to the condenser 22 through a cone 24 positioned at the bottom of the condenser. In this case, the condenser 22 is of the reflux type and the condensate passes from the condenser into the cone 24 and then through the return conduit 26 directly to the autoclave. In the conduit 26 is provided a trap or other type of liquid sealing means 28 which will permit downward flow of condensate, but will greatly restrict or prevent the flow of vapors upwardly through conduit 26 from the autoclave to the condenser. The trap or liquid seal 28 is not absolutely essential to the successful operation of the apparatus or process, but is generally desirable in order to obtain smoother and more rapid operation of the process.

A vent pipe 30 controlled by valve 32 is provided at the top of the condenser for the controlled venting of non-condensible gases. The condenser is also provided with the usual inlet pipe 34 and outlet pipe 36 for circulation of cooling media.

The autoclave is also provided with a vent pipe 38 controlled by valve 40 for the release of pressure and removal of excess ethyl chloride when the reaction is completed. A pressure equalizing line 42 controlled by valve 44 is shown between the vent pipe and ethyl chloride storage tank. If desired, this equalizing line may lead off from the autoclave or the charging pipe 12 if desired.

In the operation of the process, employing the apparatus of Fig. 1, the lead-sodium alloy is charged into the autoclave and the ethyl chloride is placed in the tank 14 and the system is closed. The ethyl chloride is fed from the tank 14 into the autoclave at a predetermined gradual rate. As the reaction starts, large amounts of heat are generated and part of the ethyl chloride is vaporized. The temperature and pressure are permitted to build-up until the optimum conditions for the reaction are obtained. The temperature and pressure tend to rise still further, but, when the optimum conditions are obtained, the flow of cooling fluid in the jacket of the autoclave and in the condenser is started and increased to prevent the temperature and pressure from rising materially above the optimum temperature and pressure. When cooling fluid is passed through the condenser the ethyl chloride therein is condensed and the rest of the ethyl chloride, as it is vaporized, passes upwardly through conduit 20 and cone 24 into the condenser 22. The condensed ethyl chloride flows into the cone 24 where a body of liquid ethyl chloride accumulates causing the cone to act as a liquid gas separator. The condensate further flows downwardly through conduit 26 to the autoclave where it absorbs heat from the reaction due to its difference in temperature and due to at least partial re-evaporation. The flow of ethyl chloride from the tank 14 into the autoclave is regulated so that it is at the maximum rate which will maintain the temperature and pressure at the maximum while employing the maximum cooling in the condenser and autoclave which can be obtained with the particular equipment.

When the trap or liquid seal 28 is provided, the condensed ethyl chloride flows into the trap to provide the desired liquid seal preventing vapors from flowing upwardly through the conduit 26 to the cone 24. Thereby there is provided a smoother flow of condensate from the condenser and the cone 24 is rendered more efficient as a liquid-gas separator. The condenser is placed at a sufficient height above the autoclave and the trap to allow for a head of liquid between the cone 24 and the autoclave greater than the pressure differential between these points caused by the pressure drop in the condenser. The distance between the cone 24 and the trap 28 must also be sufficient to provide a head of liquid great enough to cause the condensate to flow through the trap.

As the process proceeds, non-condensible gases accumulate in the top of the condenser and they would ordinarily upset the desired pressure-temperature relationships. As the non-condensibles accumulate to an undesirable and objectionable extent, they are vented off through vent pipe 30. This permits maintenance of the desired pressure-temperature relationships and overcomes one of the main objectionable features of Patent 2,091,112. Also, by venting the non-condensibles from the top of the condenser in this manner, the venting of large amounts of ethyl chloride with the non-condensibles, as was obtained in the process and apparatus of Patent 2,091,112, is avoided.

By this arrangement and process, more efficient control of the temperature and pressure in the autoclave is readily maintained. Also, larger amounts of ethyl chloride are introduced into the autoclave over a unit period of time and from two sources, the ethyl chloride storage tank and the condenser. Thus, the manufacturing time cycle is very materially reduced and the reaction is carried out more smoothly and successfully whereby greatly increased production is obtained.

Figure 2:
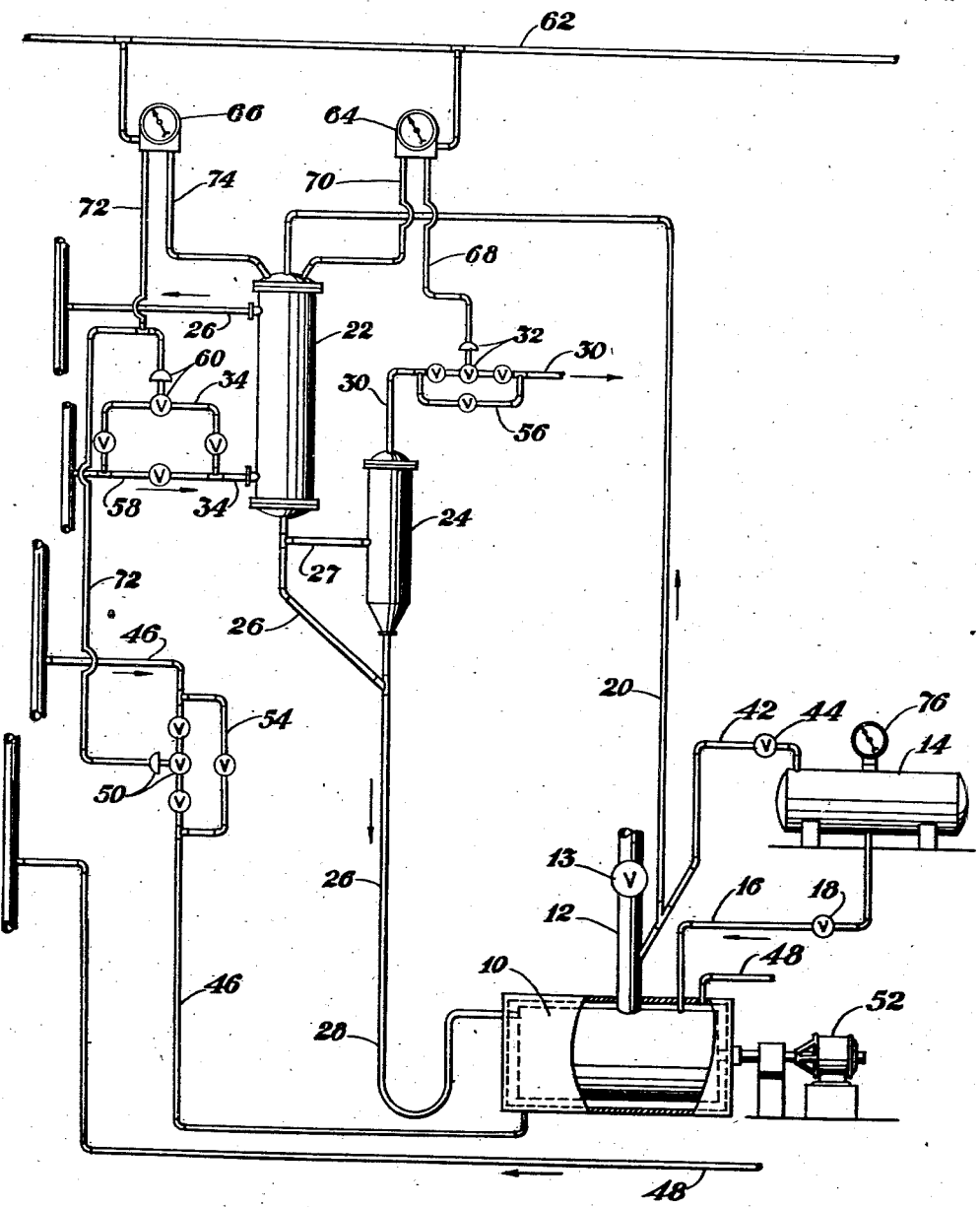
Fig. 2 is a representation, with parts broken away for clearness of illustration, of a preferred form of apparatus for carrying out our process.

Fig. 2 discloses an apparatus which is similar in structure and operates on substantially the same principles as that of Fig. 1, but which is slightly different in certain details and illustrates a preferred form of the invention. In Fig. 2, the numeral 10 designates the jacketed autoclave provided with the charging pipe 12 closed by valve 13. In this modification of the apparatus, the ethyl chloride feed line 16, leading from the ethyl chloride storage tank 14 and controlled by valve 18 leads directly into the autoclave rather than into the charging pipe 12. The scale supporting the ethyl chloride storage tank is indicated at 76. The ethyl chloride vapor line 20 leads into the top of the condenser 22, which is structurally similar to the condenser disclosed in Patent 2,091,112. The return pipe 26 for returning the condensed ethyl chloride to the autoclave is provided with a U-bend 28 which serves the same purpose as the trap 28 in the apparatus illustrated in Fig. 1.

In the modification illustrated in Fig. 2, the liquid-gas separator is separated from the condenser and is in the form of a cyclone separator 24. The conduit 27 leads off from the return conduit 26 and leads into the liquid-gas separator 24 so as to direct the gases flowing through it into the liquid-gas separator in a tangential direction. The vent pipe 30, controlled by the valve 32, leads off from the top of the liquid-gas separator.

In the modification shown in Fig. 2, the inlet pipe 34 for the cooling media for the condenser enters at the bottom and the outlet pipe 36 leads off from the top of the condenser. Also, the equalizing line 42 connects the ethyl chloride storage tank with the ethyl chloride vapor line 20 instead of a separate vent pipe. Furthermore, there is shown in Fig. 2, the inlet pipe 46 and the outlet pipe 48 for the cooling media employed in the jacket of the autoclave. Still further, a motor 52 is shown for operating the usual agitator, not shown, in the autoclave.

In the feed line 46, there is provided an air operated diaphragm valve 50, together with a by-pass line 54 and conventional auxiliary hand-operated valves. Also, the valve 32 is an air operated diaphragm valve and has associated with it the conventional by-pass 56 and auxiliary hand-operated valves. Similarly, the inlet pipe 34 for the condenser is also provided with an air operated diaphragm valve 60, by-pass line 58 and auxiliary hand-operated valves. Line 62 is the air supply line for operating these diaphragm valves. Valve 32 is operated through the pressure actuated controller 64 and line 68. Controller 64 is responsive to the pressures in the top of the condenser and is suitably connected thereto by line 70. The valves 50 and 60 are operated through line 72 connected with the pressure actuated controller 66. Controller 66 is also connected to the top of the condenser through line 74 and is responsive to the pressures in the condenser.

The process, as applied for instance to the preparation of tetra ethyl lead by the present improved method and employing the apparatus just described and illustrated in Fig. 2, may be illustrated as follows:

A weighted amount of lead-mono-sodium alloy is introduced into the autoclave 10 through the autoclave feed chute 12, the valve 13 is closed and the autoclave agitator motor 52 is started. The ethyl chloride scale tank 14, having been filled previously with the required amount of ethyl chloride, the valve 18 is opened and the ethyl chloride is allowed to flow into the autoclave continuously at a controlled rate, the amount being read from the scale dial 76. As the reaction between the ethyl chloride and the alloy begins, heat is evolved and the pressure of the system begins to rise due to the vapor pressure of the ethyl chloride at the temperature of the reaction. As the pressure and temperature approaches that temperature and pressure which has been determined to be the optimum for the reaction, usually from about 65° C. to about 75° C. and from about 50 to about 65 pounds per square inch gauge pressure, the controller 66 will operate valves 50 and 60 to cause cooling media to flow through the autoclave jacket and the condenser, respectively. Usually, the controller will be caused to start opening the valves 50 and 60 when the pressure in the system reaches about 45 to about 60 pounds per square inch.

By the time that the controller 66 starts to open the valves 50 and 60, the autoclave, condenser, liquid-gas separator and connecting pipes are filled with the vapors of ethyl chloride. The ethyl chloride in the condenser is now condensed and the condensate flows through the return conduit 26, fills the U-bend or trap 28 and finally flows back to the autoclave. Condensation of the ethyl chloride in the condenser causes a decreased pressure in the condenser drawing more vapors through the vapor line 20 from the autoclave. The U-bend or trap 28 provides a liquid seal which prevents return of the vapors through this section, but permits free flow of the condensed ethyl chloride to the autoclave. The non-condensible gases pass into the liquid-gas separator 24 mainly through the pipe 27 and, since they enter the cylindrical liquid-gas separator 24 in a tangential direction, any entrained ethyl chloride is separated from the non-condensible gases by centrifugal action. The separated ethyl chloride then flows downwardly into the conduit 26, trap 28 and autoclave 10. The condenser and the liquid-gas separator are placed above the autoclave at a sufficient height to provide a head of liquid between the separator and the autoclave greater than the pressure differential between these points caused by the pressure drop through the condenser.

As more ethyl chloride is added to the autoclave and the reaction progresses, the pressure and temperature in the system continues to rise. With such rise in pressure, the controller 66 causes the valves 50 and 60 to be opened further and finally, when the pressure which is most conducive to the production of high yields of tetra ethyl lead is obtained, full flow of the cooling media to the condenser and the autoclave jacket is obtained. During this time, the feed of ethyl chloride from the tank 14 to the autoclave is regulated through valve 18 to cause the pressure and temperature to rise rapidly to the desired optimum.

Control of the operation, as has been just described, would be sufficient were it not for the fact that considerable quantities of non-condensible gases are formed as the result of side reactions. It is essential that these gases be properly vented from the system without, at the same time, venting large quantities of ethyl chloride and without upsetting the pressure-temperature relationships desired. For this purpose, the controller 64 is set to open valve 32 at pressures slightly above that at which controller 66 fully opens valves 50 and 60. In other words, after the optimum conditions of temperature and pressure have been obtained and the valves 50 and 60 are fully opened so that the process is being operated at maximum speed, the pressure tends to rise, without corresponding increase in temperature, due to the non-condensible gases in the system. When the pressure rises slightly above such optimum conditions, the controller 64 starts to operate valve 32 to vent non-condensible gases from the liquid-gas separator. Usually, the controller 64 will start to open the valve 32 at pressures from about 1 to about 5 pounds per square inch above the optimum pressure. The optimum pressure will usually be at from about 60 to about 75 pounds per square inch. Generally, the pressures in the system should not be permitted to rise above 80 pounds per square inch.

The pressure, at which the vent valve 32 is opened, is important. If the valve is opened at too low pressures, considerable quantities of ethyl chloride will be removed along with the non-condensible gases, the yield of tetraethyl lead will be lower and full benefit of cooling means will not be obtained. If, on the other hand, the venting pressure is too high, the non-condensible gases will build-up in the condenser tending to cause it to vapor lock and the reaction may get out of control because of decreased cooling. Also, the liquid-gas separator is small relative to the ethyl chloride feed tank of Patent 2,091,112. It should be as small as possible while still being of a size such as will conveniently handle the quantity of gases passing therethrough. Due to this structure, the non-condensible gases in the liquid-gas separators are in contact with only a small body of ethyl chloride which is substantially saturated with the gases. Under these circumstances, the vented gases are low in ethyl chloride and minimum losses of ethyl chloride in the vented gases are thus assured.

The feed of the ethyl chloride to the autoclave is controlled so that the ethyl chloride is added as rapidly as is possible and as the particular equipment employed will permit. The maximum rate is easily determined experimentally and a standard set up. Also, observation of the amount of venting can serve as a criterion for control of the feed. Knowing the quantity of non-condensible gases usually generated in the system, more than normal rate of vent indicates the removal of excessive quantities of ethyl chloride. This, in turn, shows that the condenser is unable to condense all of the ethyl chloride vaporized and the feed rate must be lower. Conversely, a low rate of vent indicates that more rapid addition of ethyl chloride is desirable. The temperature-pressure relationship is also a criterion for controlling the rate of feed of ethyl chloride. When the temperatures obtained are higher than the optimum for the desired pressure, the feed of ethyl chloride should be decreased. Conversely, low temperatures indicate the desirability of more rapid addition of the ethyl chloride. The rate of addition of the ethyl chloride should be such as to raise the temperatures and pressures up to the optimum as rapidly as possible. If the pressures tend to rise as high as 80 pounds per square inch or above, the rate of feed of the ethyl chloride should be decreased. While the valve 18, for controlling the feed of ethyl chloride, is shown as hand operated, it may be automatically controlled by the temperatures or pressures in the system in accordance with the principles herein set forth.

When the addition of ethyl chloride is complete, the pressure of the system will fall off rather rapidly. When the pressure has decreased to approximately 50 pounds per square inch, the flow of the cooling media will be stopped and the reaction permitted to go to completion. When the reaction is completed, the excess ethyl chloride is removed and the reaction mass is treated in the usual manner to recover the tetraethyl lead.

It will be seen that our invention provides for maximum use of the means of heat removal and, therefore, allows for the most rapid feed rate of ethyl chloride possible with any given equipment. Maximum use of the condenser and the autoclave jacket, as the means of heat removal, is accomplished by allowing full flow of cooling media to these points as soon as a pressure rise indicates a corresponding temperature rise, and by maintaining the condenser free of non-condensible gases, thus insuring that all condenser surface is available for heat removal, and that no vapor locking occurs. Full flow of cooling media to the condenser and autoclave jacket is retained even while venting non-condensible gases from the system, because the controller is so arranged that venting shall occur only when full flow of cooling media to these points is in effect.

Our invention has several important advantages over the system of Patent 2,091,112 which has been employed previously. By the use of our invention, we can add the ethyl chloride to the lead-sodium alloy at a rate of 2.5 times that which has been possible heretofore. Thus, the use of our invention in commercial operations has permitted the addition of the ethyl chloride to be completed in less than half the time required with greatly increased production and with no increase in operating labor or supervision. The higher rate of addition of the ethyl chloride appears to favor the formation of tetraethyl lead with fewer side reactions. In addition, the automatic venting and cooling arrangement provides the most economical and efficient heat removal. With the total elimination of vapor lock in the condenser, full condenser surface is at all times available for cooling and full flow of the cooling media to the condenser and the autoclave jacket is obtained whenever high pressures indicate high temperatures and the need for rapid heat removal. Only through maximum condenser efficiency can the most rapid addition of ethyl chloride be obtained, and our invention insures that such efficiency will be realized. These effects are obtained by venting the non-condensible gases from the system at a point in the system where such venting will not affect the rate of feed of the ethyl chloride to the autoclave. Also, by returning the condensed ethyl chloride directly to the autoclave instead of the ethyl chloride feed tank, a greater amount of ethyl chloride is fed into the autoclave in a unit of time, thereby obtaining greatly increased cooling and feed of ethyl chloride.

Although we have described our invention with particular reference to the manufacture of tetraethyl lead, it will be understood that such description is for illustrative purposes only. Our invention has been successfully employed in the preparation of other alkyl lead compounds, and particularly in the manufacture of mixed tetramethyl-ethyl lead compounds, prepared by the action of a mixture of methyl chloride and ethyl chloride on lead mono-sodium alloy. Our invention is particularly useful in the preparation of tetraalkyl lead compounds in which each alkyl group contains from 1 to 4 carbon atoms. Our invention is also applicable to the preparation of corresponding alkyl compounds of other metals such as tin and the like. Also, while we have indicated particular conditions of temperature, pressure and the like, it will be understood that such conditions may be varied without departing from our invention. The particular conditions are those which have been found to be most desirable with the particular equipment employed in one particular case. It will be understood that the equipment may be modified in various ways and as it is so modified and as more or less efficient cooling means are employed, the particular conditions employed will necessarily vary.

We claim:

1. An apparatus, adapted for preparing alkyl lead compounds from alkyl halides and lead sodium alloys, which comprises a reaction vessel, an alkyl halide storage tank, means for continuously feeding alkyl halide from the storage tank to the reaction vessel, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator associated with the condenser for separating non-condensible gases from the liquid condensate, and a controllable gas vent associated with the liquid-gas separator for controlled venting of separated non-condensible gases only from the apparatus and sealing means associated with the return conduit below the condenser preventing gaseous products from flowing upwardly through the conduit while permitting liquid condensate to pass to the reaction vessel.

2. An apparatus, adapted for preparing alkyl lead compounds for alkyl halides and lead sodium alloys, which comprises a reaction vessel, an alkyl halide storage tank, means for continuously feeding alkyl halide from the storage tank to the reaction vessel, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, and a controllable gas vent associated with the liquid-gas separator for controlled venting of separated non-condensible gases only from the apparatus, and sealing means associated with the return conduit below the condenser and liquid-gas separator preventing gaseous products from flowing upwardly through the conduit while permitting liquid condensate to pass to the reaction vessel, the condenser and the liquid-gas separator being placed above the sealing means a sufficient distance to provide a head of liquid condensate sufficient to exert a pressure greater than the pressure drop through the condenser so as to cause the liquid condensate to flow through the sealing means and into the reaction vessel.

3. An apparatus, adapted for preparing alkyl lead compounds from alkyl halides and lead sodium alloys, which comprises a reaction vessel, an alkyl halide storage tank, means for continuously feeding alkyl halide from the storage tank to the reaction vessel, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, and a liquid seal in the return conduit below the condenser and liquid-gas separator preventing gaseous products from flowing upwardly through the conduit while permitting liquid condensate to pass to the reaction vessel, the condenser and the liquid-gas separator being placed above the liquid seal a sufficient distance to provide a head of liquid condensate sufficient to exert a pressure greater than the pressure drop through the condenser so as to cause the liquid condensate to flow through the liquid seal and into the reaction vessel.

4. An apparatus, adapted for preparing alkyl lead compounds from alkyl halides and lead sodium alloys, which comprises a reaction vessel, an alkyl halide storage tank, means for continuously feeding alkyl halide from the storage tank to the reaction vessel, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, and a U-bend in the return conduit below the condenser and liquid-gas separator to provide a liquid seal preventing gaseous products from flowing upwardly through the conduit while permitting liquid condensate to pass to the reaction vessel, the condenser and the liquid-gas separator being placed above the liquid seal a sufficient distance to provide a head of liquid condensate sufficient to exert a pressure greater than the pressure drop through the condenser so as to cause the liquid condensate to flow through the liquid seal and into the reaction vessel.

5. An apparatus, adapted for preparing alkyl lead compounds from alkyl halides and lead sodium alloys, which comprises a jacketed reaction vessel, means circulating a cooling fluid through the jacket of the reaction vessel, an alkyl halide storage tank, means for continuously feeding alkyl halide from the storage tank to the reaction vessel, a condenser above the reaction vessel, means circulating a cooling fluid through the condenser, automatic control means responsive to the pressure in the apparatus automatically regulating the circulation of the cooling fluid through the condenser and through the jacket of the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, and sealing means associated with the return conduit below the condenser and liquid-gas separator preventing gaseous products from flowing upwardly through the conduit while permitting liquid condensate to pass to the reaction vessel, the condenser and the liquid-gas separator being placed above the sealing means a sufficient distance to provide a head of liquid condensate sufficient to exert a pressure greater than the pressure drop through the condenser so as to cause the liquid condensate to flow through the sealing means and into the reaction vessel.

6. An apparatus, adapted for preparing alkyl lead compounds from alkyl halides and lead sodium alloys, which comprises a reaction vessel, an alkyl halide storage tank, means for continuously feeding alkyl halide from the storage tank to the reaction vessel, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, automatic vent controlling means responsive to the pressure in the apparatus, and sealing means associated with the return conduit below the condenser and liquid-gas separator preventing gaseous products from flowing upwardly through the conduit while permitting liquid condensate to pass to the reaction vessel, the condenser and the liquid-gas separator being placed above the sealing means a sufficient distance to provide a head of liquid condensate sufficient to exert a pressure greater than the pressure drop through the condenser so as to cause the liquid condensate to flow through the sealing means and into the reaction vessel.

7. An apparatus, adapted for preparing alkyl lead compounds from alkyl halides and lead sodium alloys, which comprises a jacketed reaction vessel, means circulating a cooling fluid through the jacket of the reaction vessel, an alkyl halide storage tank, means for continuously feeding alkyl halide from the storage tank to the reaction vessel, a condenser above the reaction vessel, means circulating a cooling fluid through the condenser, automatic control means responsive to the pressure in the apparatus automatically regulating the circulation of the cooling fluid through the condenser and through the jacket of the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, automatic vent controlling means responsive to pressures in the apparatus slightly higher than those which cause the greatest flow of cooling fluid through the condenser, and sealing means associated with the return conduit below the condenser and liquid-gas separator preventing gaseous products from flowing upwardly through the conduit while permitting liquid condensate to pass to the reaction vessel, the condenser and the liquid-gas separator being placed above the sealing means a sufficient distance to provide a head of liquid condensate sufficient to exert a pressure greater than the pressure drop through the condenser so as to cause the liquid condensate to flow through the sealing means and into the reaction vessel.

8. An apparatus, adapted for preparing alkyl lead compounds from alkyl halides and lead sodium alloys, which comprises a jacketed reaction vessel, means circulating a cooling fluid through the jacket of the reaction vessel, an alkyl halide storage tank, means for continuously feeding alkyl halide from the storage tank to the reaction vessel, a condenser above the reaction vessel, means circulating a cooling fluid through the condenser, automatic control means responsive to the pressure in the apparatus automatically regulating the circulation of the cooling fluid through the condenser and through the jacket of the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, automatic vent controlling means responsive to pressures in the apparatus slightly higher than those which cause the greatest flow of cooling fluid through the condenser, and a U-bend in the return conduit below the condenser and liquid-gas separator to provide a liquid seal preventing gaseous products from flowing upwardly through the conduit while permitting liquid condensate to pass to the reaction vessel, the condenser and the liquid-gas separator being placed above the liquid seal a sufficient distance to provide a head of liquid condensate sufficient to exert a pressure greater than the pressure drop through the condenser so as to cause the liquid condensate to flow through the liquid seal and into the reaction vessel.

9. An apparatus, adapted for preparing alkyl lead compounds from alkyl halides and lead sodium alloys, which comprises a reaction vessel, an alkyl halide storage tank, means for continuously feeding alkyl halide from the storage tank to the reaction vessel, a pressure equalizing line between the reaction vessel and the alkyl halide storage tank, a condenser above the reaction vessel, a conduit connecting the reaction vessel to the condenser for conveying gaseous products to the condenser, a liquid condensate return conduit connecting the condenser to the reaction vessel independently of the alkyl halide storage tank for conducting condensed alkyl halide to the reaction vessel without passing it through the storage tank, a liquid-gas separator connected to the return conduit below the condenser so that liquid condensate by-passes the separator and uncondensed gases pass into the separator to be separated from entrained condensate, a controllable gas vent connected to the liquid-gas separator for controlled venting of separated non-condensible gases only from the liquid-gas separator, and sealing means associated with the return conduit below the condenser and liquid-gas separator preventing gaseous products from flowing upwardly through the conduit while permitting liquid condensate to pass to the reaction vessel, the condenser and the liquid-gas separator being placed above the sealing means a sufficient distance to provide a head of liquid condensate sufficient to exert a pressure greater than the pressure drop through the condenser so as to cause the liquid condensate to flow through the sealing means and into the reaction vessel.

FREDERICK C. MITCHELL.
JAMES C. LAWRENCE.
JOSEPH L. STECHER.